United States Patent
Kim et al.

(10) Patent No.: US 10,691,918 B2
(45) Date of Patent: Jun. 23, 2020

(54) METHOD AND APPARATUS FOR DETECTING FAKE FINGERPRINT, AND METHOD AND APPARATUS FOR RECOGNIZING FINGERPRINT

(71) Applicant: Samsung Electronics Co., Ltd., Suwon-si, Gyeonggi-do (KR)

(72) Inventors: Wonjun Kim, Hwaseong-si (KR); Youngsung Kim, Suwon-si (KR); Sungjoo Suh, Seoul (KR); Hyungsuk Kim, Seongnam-si (KR); Chang Kyu Choi, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 545 days.

(21) Appl. No.: 15/076,839

(22) Filed: Mar. 22, 2016

(65) Prior Publication Data

US 2017/0004351 A1 Jan. 5, 2017

(30) Foreign Application Priority Data

Jun. 30, 2015 (KR) ........................ 10-2015-0092788

(51) Int. Cl.
*G06K 9/00* (2006.01)
(52) U.S. Cl.
CPC ..... *G06K 9/00087* (2013.01); *G06K 9/00899* (2013.01)
(58) Field of Classification Search
CPC .............. G06K 9/00093; G06K 9/001; G06K 9/00073; G06K 9/00087; G06K 9/00899; G06F 21/32
See application file for complete search history.

(56) References Cited

U.S. PATENT DOCUMENTS

| | | | |
|---|---|---|---|
| 2004/0042645 A1* | 3/2004 | Wang | G06K 9/00067 382/125 |
| 2008/0212846 A1* | 9/2008 | Yamamoto | G06K 9/00087 382/115 |
| 2008/0247615 A1 | 10/2008 | Mainguet | |
| 2013/0336527 A1 | 12/2013 | Nechyba et al. | |
| 2014/0002238 A1* | 1/2014 | Taveau | G07C 9/00087 340/5.53 |
| 2014/0133711 A1* | 5/2014 | Abe | G06K 9/036 382/115 |
| 2014/0286548 A1 | 9/2014 | Shin et al. | |
| 2014/0301616 A1 | 10/2014 | Picard et al. | |
| 2016/0063300 A1* | 3/2016 | Du | G06K 9/00033 382/124 |

FOREIGN PATENT DOCUMENTS

| | | |
|---|---|---|
| CN | 101499134 A | 8/2009 |
| KR | 20010000861 A | 1/2001 |
| KR | 20110014758 A | 2/2011 |
| KR | 20110057449 A | 6/2011 |
| KR | 20130060875 A | 6/2013 |

* cited by examiner

*Primary Examiner* — Kenny A Cese
(74) *Attorney, Agent, or Firm* — Harness, Dickey & Pierce, P.L.C.

(57) ABSTRACT

An apparatus and method for detecting a fake fingerprint is disclosed. The apparatus may divide an input fingerprint image into blocks, determine an image quality assessment (IQA) value associated with each block, determine a confidence value based on the IQA values using a confidence determination model, and determine whether an input fingerprint in the input fingerprint image is a fake fingerprint based on the determined confidence value.

12 Claims, 13 Drawing Sheets

METHOD AND APPARATUS FOR DETECTING FAKE FINGERPRINT, AND METHOD AND APPARATUS FOR RECOGNIZING FINGERPRINT

CROSS-REFERENCE TO RELATED APPLICATION

This application claims priority under 35 U.S.C. § 119 to Korean Patent Application No. 10-2015-0092788, filed on Jun. 30, 2015, in the Korean Intellectual Property Office, the entire contents of which are incorporated herein by reference in its entirety.

BACKGROUND

1. Field

At least one example embodiment relates to technology for detecting a fake fingerprint and technology for recognizing a fingerprint.

2. Description of the Related Art

Recently, an importance of technology for secure authentication is increasing due to development of smartphones and various mobile and wearable devices. Among such forms of technology, fingerprint recognition technology is widely used due to a high level of convenience, security, and economic feasibility. In general fingerprint recognition, user authentication or verification may be performed by obtaining a fingerprint image of a user through a sensor and comparing the obtained fingerprint image to a pre-registered fingerprint image. When a finely fabricated fake fingerprint pattern is input to the sensor, a fingerprint recognizing apparatus may not distinguish the fake fingerprint pattern from a genuine fingerprint pattern and thus, may recognize the fake fingerprint pattern as a biological fingerprint. For example, when a material such as rubber, silicon, gelatin, epoxy, and latex on which a fingerprint is engraved makes a contact with the sensor, the fingerprint engraved on such a material may be recognized as a human fingerprint.

SUMMARY

As least some example embodiments relate to a method of detecting a fake fingerprint.

In at least one example embodiment, the method may include dividing an input fingerprint image into blocks, determining an image quality assessment (IQA) value associated with each block, determining a first confidence value based on the IQA values using a first confidence determination model, and determining whether an input fingerprint in the input fingerprint image is a fake fingerprint based on the first confidence value, the fake fingerprint being a fabricated fingerprint.

The determining the confidence value may include generating a feature vector based on the IQA value of each block, and obtaining the first confidence value from the feature vector using the first confidence determination model.

The determining of the confidence value may include determining a second confidence value from the IQA value of each block using a second confidence determination model, and determining the first confidence value from the second confidence value using the first confidence determination model.

The determining the first confidence value may include generating a feature vector based on the second confidence value determined for each block, and obtaining the first confidence value from the feature vector using the first confidence determination model.

At least other example embodiments relate to a method of recognizing a fingerprint.

In at least one example embodiment, the method may include determining an IQA value of an input fingerprint image, determining a degree of similarity between a registered fingerprint and an input fingerprint in the input fingerprint image, and verifying the input fingerprint based on the determined IQA value and the determined degree of similarity.

The verifying the input fingerprint may include determining a matching score by combining the IQA value and the degree of similarity, and verifying the input fingerprint by comparing the matching score to a threshold value.

The determining the IQA value may include obtaining a processed input fingerprint image by filtering the input fingerprint image, and determining the IQA value of the input fingerprint image based on a difference between the input fingerprint image and the processed input fingerprint image.

At least other example embodiments relate to an apparatus for recognizing a fingerprint.

In at least one example embodiment, the apparatus may include an image quality assessor configured to determine an IQA value of an input fingerprint image, a fake fingerprint determiner configured to determine whether an input fingerprint in the input fingerprint image is a fake fingerprint based on the IQA value of the input fingerprint image, and a fingerprint verifier configured to verify the input fingerprint based on the IQA value of the input fingerprint image and a degree of similarity between the input fingerprint and a registered fingerprint, when the input fingerprint is not determined to be a fake fingerprint.

At least other example embodiments relate to an apparatus for recognizing a fingerprint.

In at least one example embodiment, the apparatus may include a memory configured to store computer readable instructions; and a processor configured to execute the instructions such that the processor is configured to determine an IQA value of an input fingerprint image, determine a degree of similarity between a registered fingerprint and an input fingerprint in the input fingerprint image, and a verify the input fingerprint based on the determined IQA value and the determined degree of similarity.

At least other example embodiments relate to an apparatus for detecting a fake fingerprint.

In at least one example embodiment, the apparatus may include a memory configured to store computer readable instructions; and a processor configured to execute the instructions such that the processor is configured to divide an input fingerprint image into blocks, determine an IQA value associated with each block, determine a first confidence value from the IQA values using a first confidence determination model and determine whether an input fingerprint in the input fingerprint image is a fake fingerprint based on the first confidence value, the fake fingerprint being a fabricated fingerprint.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
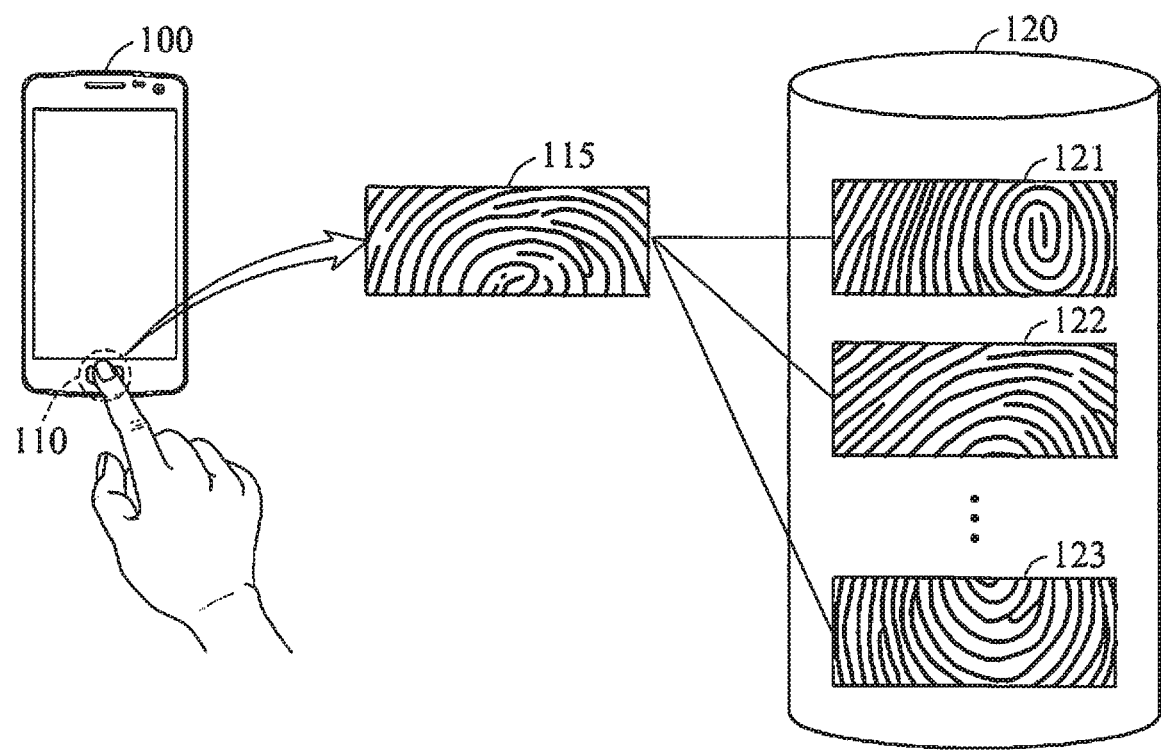
FIGS. 1A and 1B illustrate a method of recognizing a fingerprint according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the descriptions to be provided hereinafter, recognition of a fingerprint of a user may include verifying or identifying the user by recognizing the fingerprint of the user. The verifying of the user may include determining whether the user is a pre-registered user. In such a case, a result of the verifying may be output as success or failed, for example, true or false. The identifying of the user may include determining which pre-registered user matches the user. In such a case, a result of the identifying may be output as an identity (ID) of the matching pre-registered user.

Example embodiments to be described hereinafter may be provided in various forms of products including, for example, a personal computer (PC), a laptop computer, a tablet PC, a smartphone, a television (TV), a smart home appliance, an intelligent vehicle, a kiosk, and a wearable device. For example, the example embodiments may be applied to perform fingerprint recognition in a smartphone, a mobile device, a smart home system, an intelligent vehicle, and the like, or to detect a fake fingerprint in fingerprint recognition. In addition, the example embodiments may be applied to detect a fake fingerprint in a payment service using fingerprint recognition or perform fingerprint recognition. Hereinafter, a fake fingerprint may include a forged and/or a fabricated fingerprint.

FIG. 1A illustrates a method of recognizing a fingerprint according to at least one example embodiment. Referring to FIG. 1A, an apparatus for recognizing a fingerprint, hereinafter simply referred to as a fingerprint recognizing apparatus 100, includes a fingerprint sensor 110 configured to sense a fingerprint of a user. The fingerprint recognizing apparatus 100 obtains an input fingerprint image 115 including the fingerprint of the user through the fingerprint sensor 110. The input fingerprint image 115 may be obtained as a partial image by capturing a portion of the fingerprint of the user.

The fingerprint recognizing apparatus 100 may recognize the fingerprint of the user by comparing the fingerprint in the input fingerprint image 115, hereinafter also referred to as an input fingerprint, to registered fingerprints in registered fingerprint images, for example, a registered fingerprint image 121, a registered fingerprint image 122, and a registered fingerprint image 123. The registered fingerprint images 121 through 123 may be prestored in a registered fingerprint database 120 through a fingerprint registration process. The registered fingerprint database 120 may be stored in a memory (not shown) included in the fingerprint recognizing apparatus 100, or in an external apparatus (not shown) such as a server that may communicate with the fingerprint recognizing apparatus 100.

Figure 1B:
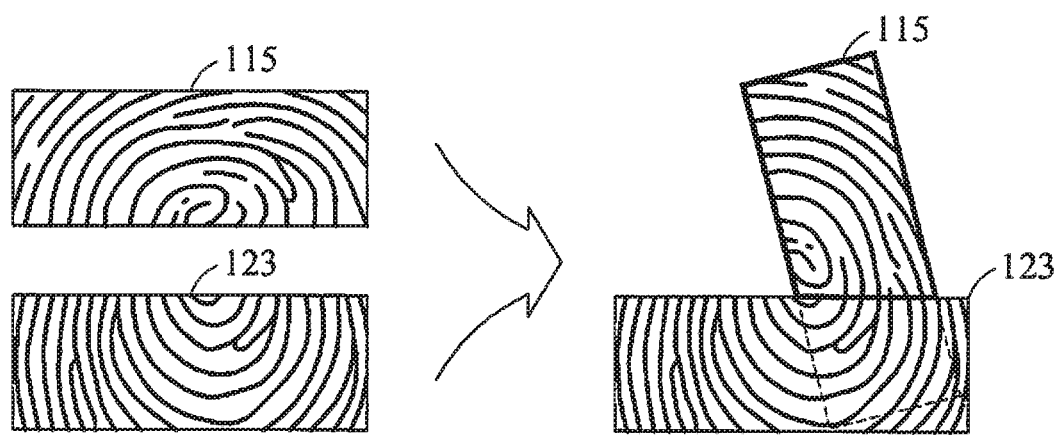

FIG. 1B illustrates a process of comparing the input fingerprint image 115 to the registered fingerprint image 123. Referring to FIG. 1B, the fingerprint recognizing apparatus 100 performs image matching using the input fingerprint image 115 and the registered fingerprint image 123 to compare the input fingerprint image 115 to the registered fingerprint image 123. For example, the fingerprint recognizing apparatus 100 may adjust a size of the input fingerprint image 115, or rotate or translate the input fingerprint image 115 to overlap a common area between the input fingerprint image 115 and the registered fingerprint image 123 that is shared by the input fingerprint image 115 and the registered fingerprint image 123. The fingerprint recognizing apparatus 100 may calculate a degree of similarity between fingerprint patterns in the common area and determine a recognition result based on the calculated degree of similarity.

When the input fingerprint image 115 is obtained by sensing a fake fingerprint, and the respective fingerprint patterns of the input fingerprint image 115 and the registered fingerprint image 123 are similar, a result of incorrectly verifying the fake fingerprint may be successful. Thus, due to such an issue of misrecognition, determining whether the input fingerprint in the input fingerprint image 115 is the fake fingerprint or a genuine fingerprint of the user may be necessary. In an example, the fingerprint recognizing apparatus 100 may include an apparatus for detecting a fake fingerprint, hereinafter simply referred to as a fake fingerprint detecting apparatus (not shown in FIG. 1), and determine whether an input fingerprint is a fake fingerprint through the fake fingerprint detecting apparatus.

Figure 2:
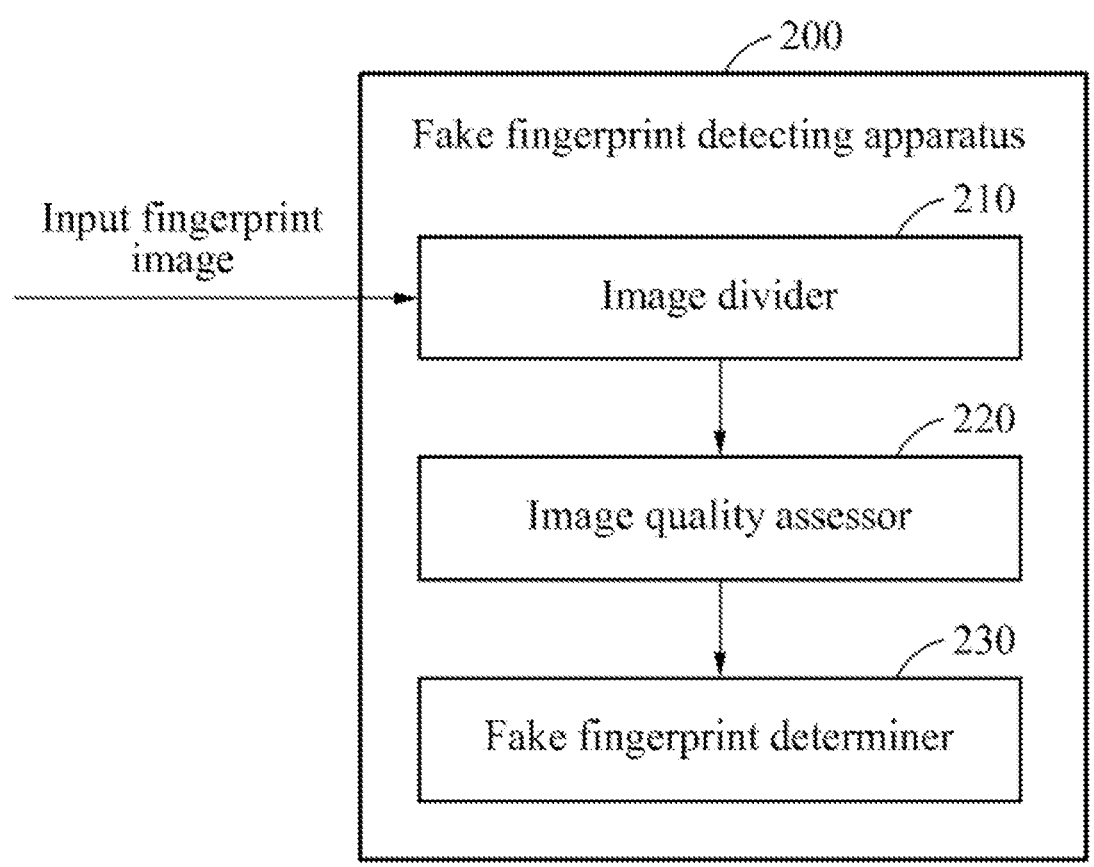
FIG. 2 is a diagram illustrating an apparatus for detecting a fake fingerprint according to at least one example embodiment.

FIG. 2 is a diagram illustrating a fake fingerprint detecting apparatus 200 according to at least one example embodiment. The fake fingerprint detecting apparatus 200 may detect a forgery or a fabrication of an input fingerprint appearing on an input fingerprint image. When a fingerprint sensor is touched by a fake fingerprint engraved on rubber, silicon, gelatin, latex, and the like, a touching pressure may partially vary and thus, an uneven image quality may be obtained for the input fingerprint image or a local distortion may occur in the input fingerprint image. In addition, due to a unique characteristic of such a material on which the fake fingerprint is engraved, image quality degradation which does not occur in a fingerprint image obtained by sensing a genuine fingerprint may occur. The fake fingerprint detecting apparatus 200 may determine whether the input fingerprint is a fake fingerprint by assessing a quality of the input fingerprint image and thus, readily detect the fake fingerprint.

Referring to FIG. 2, the fake fingerprint detecting apparatus 200 includes an image divider 210, an image quality assessor 220, and a fake fingerprint determiner 230.

The image divider 210 divides an input fingerprint image into a plurality of blocks. The image divider 210 may divide the input fingerprint image into the blocks based on a predetermined and/or selected pattern. The pattern may be determined based on a shape, a size, and the like of the input fingerprint image. As necessary, the pattern may be dynamically modified. In an example, the image divider 210 may divide the input fingerprint image to allow neighboring blocks to overlap or divide a portion of the input fingerprint image into blocks.

The image quality assessor 220 determines an image quality assessment (IQA) value by assessing an image quality of each block. For example, the image quality assessor 220 may determine an IQA value of the input fingerprint image using IQA methods, for example, blind image quality index (BIQI), naturalness image quality evaluator (NIQE), blind/referenceless image spatial quality evaluator (BRISQUE), and single stimulus quality evaluation (SSQE). The foregoing IQA methods are provided as an example and thus, the image quality assessor 220 may determine an IQA value of each block using various IQA methods other than the foregoing IQA methods. When a plurality of IQA methods is used, the image quality assessor 220 may determine a plurality of IQA values for one block.

The fake fingerprint determiner 230 determines whether an input fingerprint in the input fingerprint image is a fake fingerprint based on the IQA value (or IQA values) of each block. The fake fingerprint determiner 230 generates a feature vector based on the IQA value of each block, and obtains a confidence value from a confidence determination model by inputting the generated feature vector to the confidence determination model. For example, the fake fingerprint determiner 230 may generate the feature vector by concatenating the IQA values of the blocks. The confidence determination model may be based on a support vector machine (SVM) model or a neural network model, and pre-learned through a training process. The training process of the confidence determination model will be described in detail with reference to FIG. 12.

The fake fingerprint determiner 230 determines whether the input fingerprint is a fake fingerprint based on the confidence value determined from the confidence determination model. For example, the fake fingerprint determiner 230 may compare the confidence value to a threshold value, and determine the input fingerprint to be a fake fingerprint in response to the confidence value being less than the threshold value and determine the input fingerprint to be a genuine fingerprint in response to other cases.

Alternatively, the confidence determination model may include a first confidence determination model and a second confidence determination model. The fake fingerprint determiner 230 determines first confidence values from the IQA values of the blocks using the first confidence determination model. Here, a first confidence value may be determined for each block. The fake fingerprint determiner 230 generates a feature vector based on the first confidence values of the blocks, and obtains a second confidence value from the second confidence determination model by inputting the generated feature vector to the second confidence determination model. For example, the fake fingerprint determiner 230 may generate the feature vector by concatenating the first confidence values of the blocks. The fake fingerprint determiner 230 determines whether the input fingerprint is a fake fingerprint based on the second confidence value. For example, the fake fingerprint determiner 230 may compare the second confidence value to a threshold value, and determine the input fingerprint to be a fake fingerprint in response to the second confidence value being less than the threshold value and determine the input fingerprint to be a genuine fingerprint in other cases.

The IQA value determined in a block unit of the input fingerprint image may exhibit a local image quality deterioration or distortion that may occur when a fake fingerprint is sensed. The fake fingerprint detecting apparatus 200 may effectively detect a fake fingerprint using such a local feature of an input fingerprint image.

Figure 3:
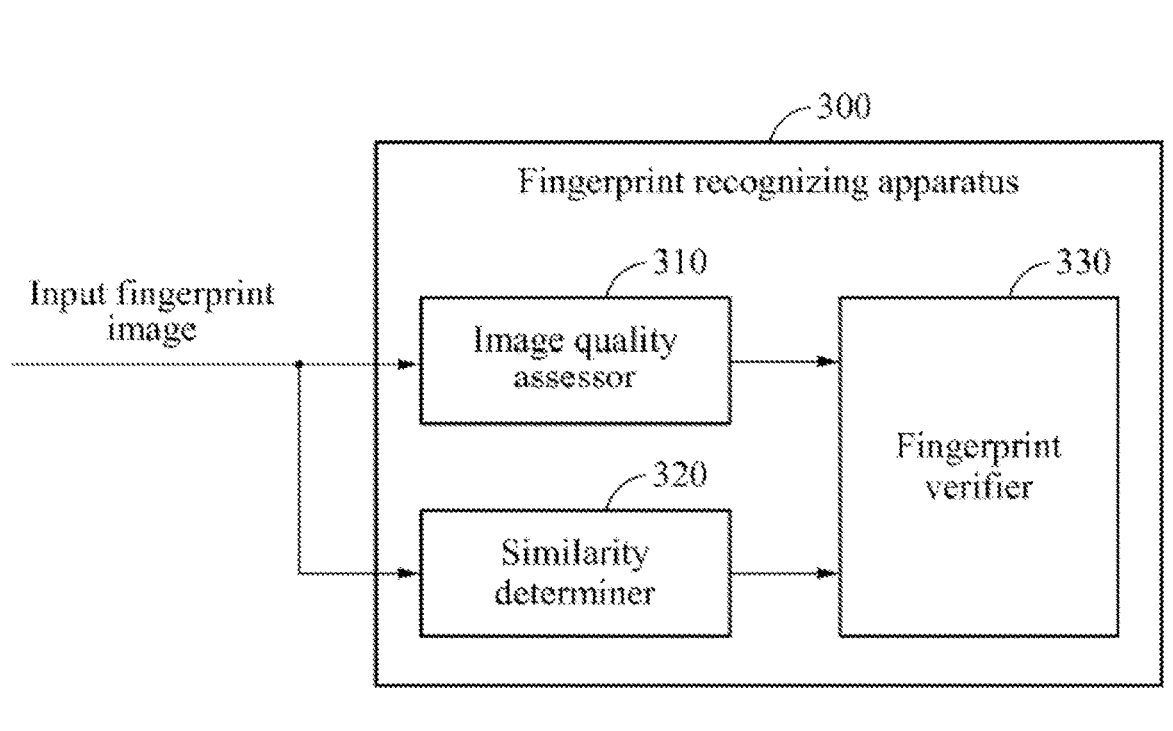
FIG. 3 is a diagram illustrating an apparatus for recognizing a fingerprint according to at least one example embodiment.

FIG. 3 is a diagram illustrating an example of a fingerprint recognizing apparatus 300 according to at least one example embodiment. The fingerprint recognizing apparatus 300 may perform fingerprint recognition based on an image quality of an input fingerprint image. For example, when a user touches a fingerprint sensor with a hand dampened with water or sweat or noise flows in or is generated, an input fingerprint image of a low image quality may be obtained. When analyzing a fingerprint pattern in the input fingerprint image of the low image quality, the fingerprint pattern may be misrecognized due to noise. The fingerprint recognizing apparatus 300 may prevent false acceptance of a fingerprint and improve fingerprint recognition performance based on an image quality of an input fingerprint image in addition to a degree of similarity between fingerprint patterns when performing fingerprint recognition.

Referring to FIG. 3, the fingerprint recognizing apparatus 300 includes an image quality assessor 310, a similarity determiner 320, and a fingerprint verifier 330.

The image quality assessor 310 determines an IQA value by assessing an image quality of an input fingerprint image. For example, the image quality assessor 310 may determine the IQA value using IQA methods such as BIQI, NIQE, BRISQUE, and SSQE. Alternatively, the image quality assessor 310 may process the input fingerprint image through filtering, for example, bandpass filtering, to obtain the processed input fingerprint image, and determine the IQA value using a difference between the original input fingerprint image and the processed input fingerprint image. When the image quality of the input fingerprint image is lower, the difference in the image quality may become greater based on the presence of the filtering. The image quality assessor 310 may determine the IQA value of the input fingerprint image based on such a difference in the image quality. In the presence of the filtering, a relative difference between the original input fingerprint image and the processed input fingerprint image may be used and thus, a more accurate IQA value may be determined without an influence of a characteristic of a fingerprint sensor.

The similarity determiner 320 determines a degree of similarity between a preregistered fingerprint and an input fingerprint in the input fingerprint image. The similarity determiner 320 performs image matching using the input fingerprint and the registered fingerprint, and calculates a degree of similarity between fingerprint patterns of the input fingerprint and the registered fingerprint based on a result of the image matching. The similarity determiner 320 detects a shared area between the input fingerprint and the registered fingerprint through the matching process including scaling, rotating, or translating the input fingerprint image, and compares the fingerprint patterns of the input fingerprint and the registered fingerprint in the shared area to calculate the degree of similarity. For example, the similarity determiner 320 may calculate the degree of similarity using a normalized correlation method based on an image brightness value.

In an example, the process of determining the IQA of the input fingerprint image by the image quality assessor 310 and the process of determining the degree of similarity between the input fingerprint and the registered fingerprint by the similarity determiner 320 may be sequentially performed or performed in parallel.

The fingerprint verifier 330 verifies the input fingerprint based on the IQA value of the input fingerprint image and the degree of similarity between the input fingerprint and the registered fingerprint. The fingerprint verifier 330 determines a matching score based on the IQA value and the degree of similarity, and verifies the input fingerprint based on the matching score and a threshold value. For example, the fingerprint verifier 330 may calculate the matching score by multiplying the IQA value and the degree of similarity, and determine the verifying to be successful in response to the calculated matching score being greater than the threshold value and determine the verifying to be failed in other cases.

The fingerprint verifier 330 performs the foregoing processes on other registered fingerprints, and determines whether a registered fingerprint having a matching score greater than the threshold value is present. In response to the presence of the registered fingerprint having the matching score greater than the threshold value, the fingerprint verifier 330 determines the verifying of the input fingerprint to be successful.

Alternatively, the fingerprint verifier 330 determines whether the IQA value of the input fingerprint image is less than a reference value. In response to the IQA value being less than the reference value, the fingerprint verifier 330 determines the verifying of the input fingerprint to be a failure irrespective of the degree of similarity between the input fingerprint and the registered fingerprint, or outputs a message to request an input of a new input fingerprint. For example, in response to the IQA value being less than the reference value, the fingerprint verifier 330 may display a phrase requesting a user to re-input a fingerprint.

Figure 4:
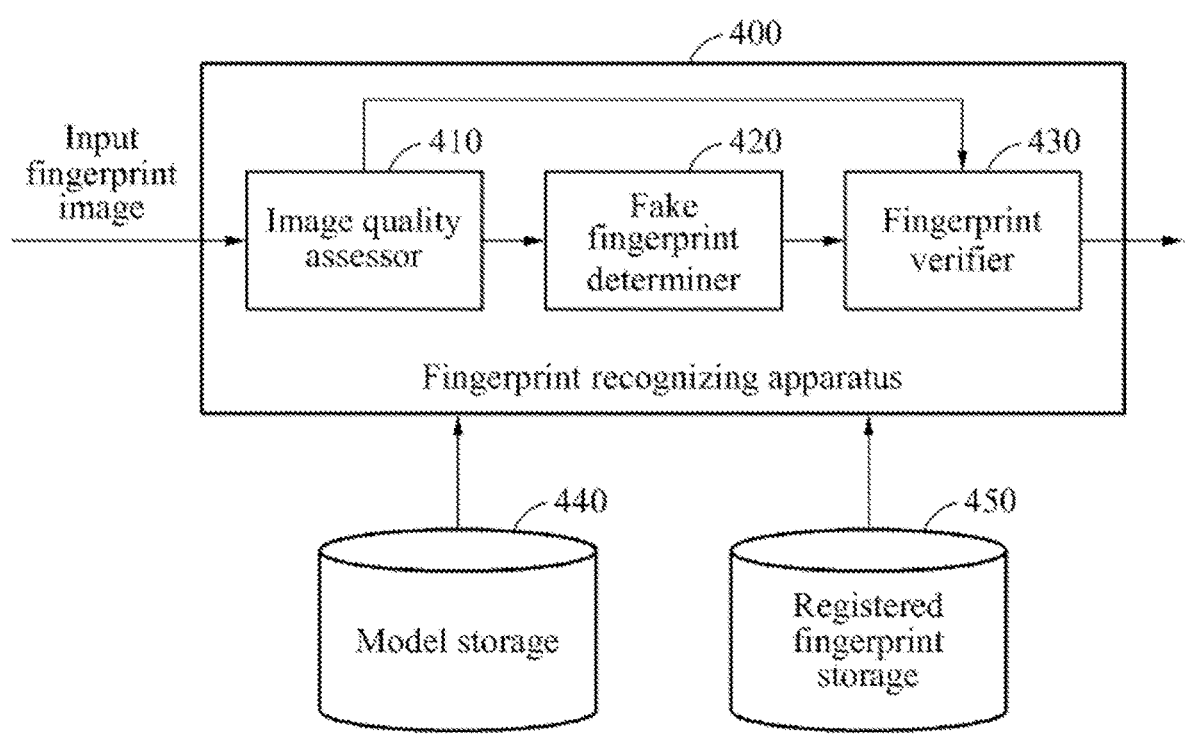
FIG. 4 is a diagram illustrating an apparatus for recognizing a fingerprint according to at least another example embodiment.

FIG. 4 is a diagram illustrating a fingerprint recognizing apparatus 400 according to at least another example embodiment. The fingerprint recognizing apparatus 400 may detect a fake fingerprint based on an image quality of an input fingerprint image and perform fingerprint recognition. Referring to FIG. 4, the fingerprint recognizing apparatus 400 includes an image quality assessor 410, a fake fingerprint determiner 420, and a fingerprint verifier 430.

The image quality assessor 410 determines an IQA value of an input fingerprint image. The image quality assessor 410 determines the IQA value in a block unit of the input fingerprint image. The descriptions of the image quality assessor 220 provided with reference to FIG. 2 may be applicable and thus, more detailed descriptions will be omitted here.

The fake fingerprint determiner 420 determines whether an input fingerprint in the input fingerprint image is a fake fingerprint based on the IQA value of the input fingerprint image. The fake fingerprint determiner 420 inputs the IQA value to a confidence determination model stored in a model storage 440 and obtains a confidence value from the confidence determination model. The fake fingerprint determiner 420 determines whether the input fingerprint is a fake or a genuine fingerprint based on the obtained confidence value. The descriptions of the fake fingerprint determiner 230 provided with reference to FIG. 2 may be applicable to the fake fingerprint determiner 420 and thus, more detailed descriptions will be omitted here. The model storage 440 may be included in the fingerprint recognizing apparatus 400 or in an external device such as a server.

When the input fingerprint is determined to be a fake fingerprint, the fingerprint verifier 430 determines verifying the input fingerprint to be a failure without comparing the input fingerprint to a registered fingerprint stored in a registered fingerprint storage 450. The registered fingerprint storage 450 may include at least one registered fingerprint which is registered through a registration process, and be included in the fingerprint recognizing apparatus 400 or in an external device such as a server.

When the input fingerprint is determined to be a genuine fingerprint, the fingerprint verifier 430 verifies the input fingerprint. The fingerprint verifier 430 verifies the input fingerprint based on the IQA value of the input fingerprint image and a degree of similarity between the input fingerprint and the registered fingerprint. The fingerprint verifier 430 determines a matching score by combining the IQA value and the degree of similarity, and verifies the input fingerprint by comparing the matching score to a threshold value. The descriptions of the fingerprint verifier 330 provided with reference to FIG. 3 may be applicable to the fingerprint verifier 430 and thus, more detailed descriptions will be omitted here.

Figure 5:
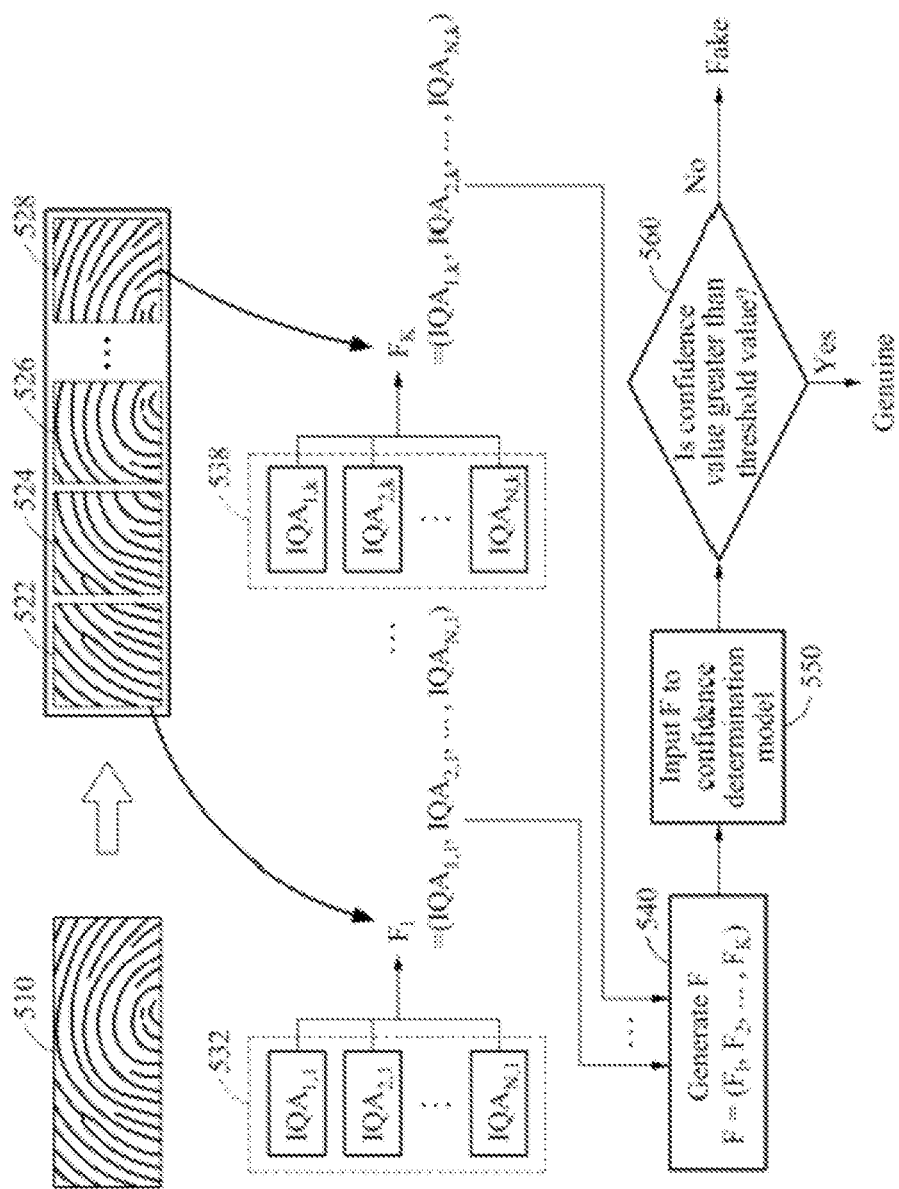
FIG. 5 illustrates a method of detecting a fake fingerprint according to at least another example embodiment.

FIG. 5 illustrates a method of detecting a fake fingerprint according to at least one example embodiment. The method of FIG. 5 may be performed by the fake fingerprint detecting apparatus 200.

Referring to FIG. 5, the fake fingerprint detecting apparatus 200 of FIG. 2 divides an input fingerprint image 510 into a plurality of blocks, for example, a first block 522, a second block 524, a third block 526, and a K-th block 528. In FIG. 5, the input fingerprint image 510 is assumed to be divided into K blocks, for example, the blocks 522 through 528. The fake fingerprint detecting apparatus 200 determines IQA values for the K blocks 522 through 528. In an example, the fake fingerprint detecting apparatus 200 may determine N IQA values of each of the blocks 522 through 528 using N different IQA methods.

As illustrated in FIG. 5, the fake fingerprint detecting apparatus 200 determines N IQA values 532, for example, an $IQA_{1,1}$ an $IQA_{2,1}$ ..., and an $IQA_{N,1}$, by applying the N IQA methods to the first block 522, and determine a feature value $F_1$ by concatenating the N IQA values 532. Similarly, the fake fingerprint detecting apparatus 200 determines N IQA values 538 for the K-th block 528 and determines a feature value $F_K$ by concatenating the N IQA values 538.

In operation 540, the fake fingerprint detecting apparatus 200 generates a feature vector F having an N×K dimension by concatenating feature values $IQA_{1,1}$-$IQA_{N,k}$ determined for the blocks 522 through 528. In operation 550, the fake fingerprint detecting apparatus 200 inputs the generated feature vector F to a confidence determination model and obtains a confidence value from the confidence determination model. The confidence determination model refers to a model configured to output a confidence value based on an input feature vector value, and is prelearned through a training process. In operation 560, the fake fingerprint detecting apparatus 200 compares the obtained confidence value to a predefined and/or selected threshold value to determine whether an input fingerprint in the input fingerprint image 510 is a fake fingerprint. The fake fingerprint detecting apparatus 200 determines the input fingerprint to be a genuine fingerprint in response to the confidence value being greater than the threshold value, and determines the input fingerprint to be a fake fingerprint in other cases.

Figure 6:
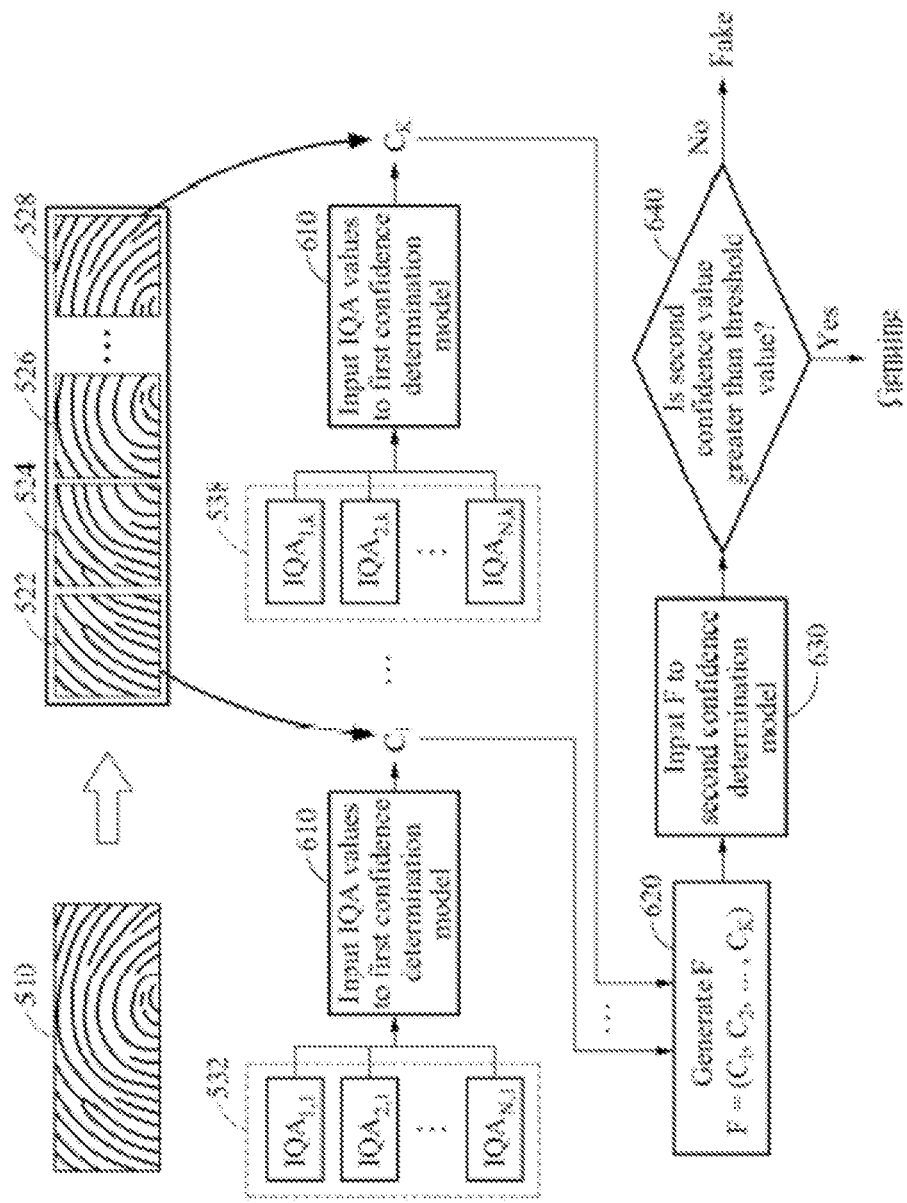
FIG. 6 illustrates a method of detecting a fake fingerprint according to at least another example embodiment.

FIG. 6 illustrates a method of detecting a fake fingerprint according to at least another example embodiment.

Referring to FIG. 6, similarly to the example method illustrated with reference to FIG. 5, the fake fingerprint detecting apparatus 200 of FIG. 2 divides an input fingerprint image 510 into a plurality of blocks, for example, a first block 522, a second block 524, a third block 526, and a K-th block 528, and calculates an IQA value for each block. As illustrated in FIG. 6, the fake fingerprint detecting apparatus 200 determines N IQA values 532, for example, an $IQA_{1,1}$ an $IQA_{2,1}$ ..., and an $IQA_{N,1}$, for the first block 522 using N IQA methods. In operation 610, the fake fingerprint detecting apparatus 200 inputs the IQA values 532 to a first confidence determination model and obtains a first confidence value $C_1$ corresponding to the first block 522 from the first confidence determination model. Similarly, the fake fingerprint detecting apparatus 200 determines N IQA values 538 for the K-th block 528. In operation 610, the fake fingerprint detecting apparatus 200 inputs the IQA values 538 to the first confidence determination model and obtains a first confidence value $C_K$ corresponding to the K-th block 528 from the first confidence determination model. A first confidence value $C_1$-$C_k$ may be determined for each of the blocks 522 through 528.

In operation 620, the fake fingerprint detecting apparatus 200 generates a feature vector F by concatenating the first confidence values $C_1$-$C_k$ determined for the blocks 522 through 528. In operation 630, the fake fingerprint detecting apparatus 200 inputs the generated feature vector F to a second confidence determination model and obtains a second confidence value from the second confidence determination model. The first confidence determination model and the second confidence determination model may be prelearned through a training process. In operation 640, the fake fingerprint detecting apparatus 200 compares the obtained second confidence value to a predefined and/or selected threshold value to determine whether an input fingerprint in the input fingerprint image 510 is a fake fingerprint. The fake fingerprint detecting apparatus 200 determines the input fingerprint to be a genuine fingerprint in response to the second confidence value being greater than the threshold value, and determines the input fingerprint to be a fake fingerprint in other cases.

Figure 7:
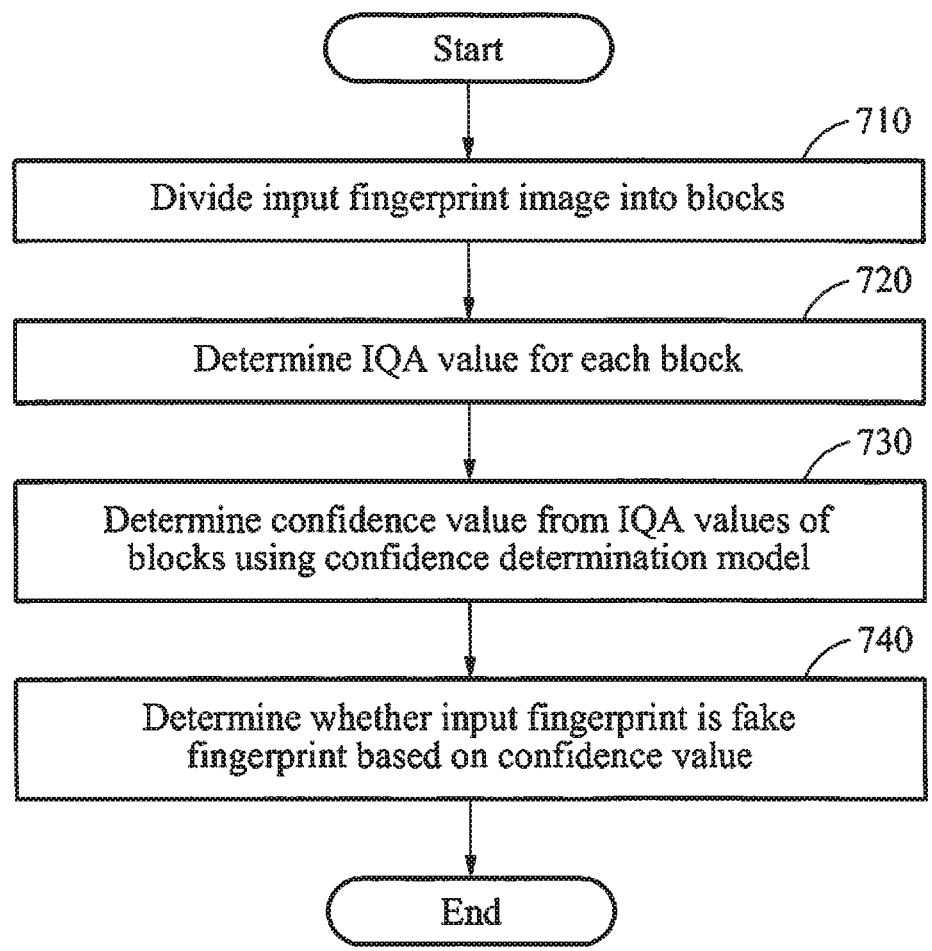
FIG. 7 is a flowchart illustrating a method of detecting a fake fingerprint according to at least another example embodiment.

FIG. 7 is a flowchart illustrating a method of detecting a fake fingerprint according to at least one example embodiment.

Referring to FIG. 7, in operation 710, a fake fingerprint detecting apparatus divides an input fingerprint image into blocks. The method of FIG. 7 may correspond to the method of FIG. 5 in flow chart form. For example, the fake fingerprint detecting apparatus may divide the input fingerprint image into the blocks to allow neighboring blocks to overlap. In operation 720, the fake fingerprint detecting apparatus determines an IQA value for each block. The fake fingerprint detecting apparatus determines the IQA value of each block by assessing an image quality of each block using a plurality of IQA methods.

In operation 730, the fake fingerprint detecting apparatus determines a confidence value from the IQA value of each block using a confidence determination model. The fake fingerprint detecting apparatus generates a feature vector by concatenating the IQA values of the blocks, and obtains the confidence value from the confidence determination model by inputting the feature vector to the confidence determination model. In operation 740, the fake fingerprint detecting apparatus determines whether an input fingerprint in the input fingerprint image is a fake fingerprint based on the confidence value. For example, the fake fingerprint detecting apparatus may determine whether the input fingerprint is a fake fingerprint by comparing the confidence value to a threshold value. If the fingerprint is not fake, a processor may proceed to control an electronic device to permit the user to use and/or access the electronic device.

Figure 8:
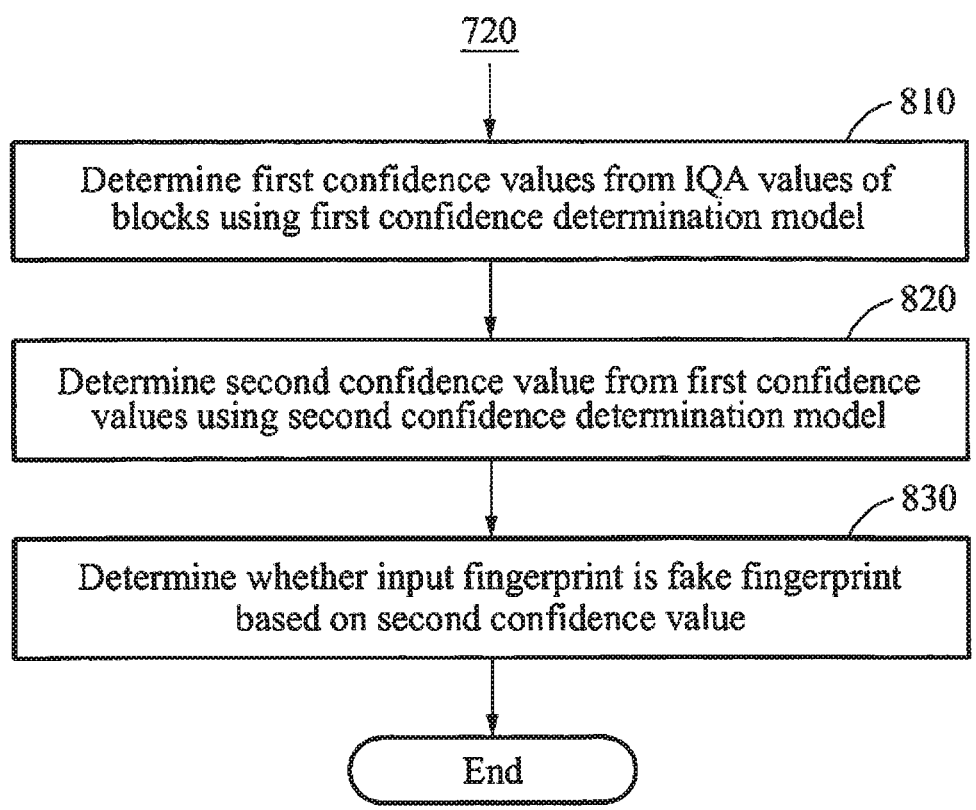
FIG. 8 is a flowchart illustrating a method of detecting a fake fingerprint according to at least another example embodiment.

FIG. 8 is a flowchart illustrating a method of detecting a fake fingerprint according to at least another example embodiment. The method of FIG. 8 may correspond to the method of FIG. 6 in flow chart form. Referring to FIG. 8, in operation 810, a fake fingerprint detecting apparatus determines first confidence values from IQA values of blocks using a first confidence determination model. For example, the fake fingerprint detecting apparatus may input the IQA values of the blocks to the first confidence determination model, and obtain the first confidence values from the first confidence determination model.

In operation 820, the fake fingerprint detecting apparatus determines a second confidence value from the first confidence values using a second confidence determination model. The fake fingerprint detecting apparatus generates a feature vector by concatenating the first confidence values determined for respective blocks, and obtains the second confidence value from the second confidence determination model by inputting the feature vector to the second confidence determination model.

In operation 830, the fake fingerprint detecting apparatus determines whether an input fingerprint in the input fingerprint image is a fake fingerprint based on the second confidence value. For example, the fake fingerprint detecting apparatus may determine whether the input fingerprint is a fake fingerprint by comparing the second confidence value to a threshold value. If the fingerprint is not fake, a processor may proceed to control an electronic device to permit the user to use and/or access the electronic device.

Figure 9:
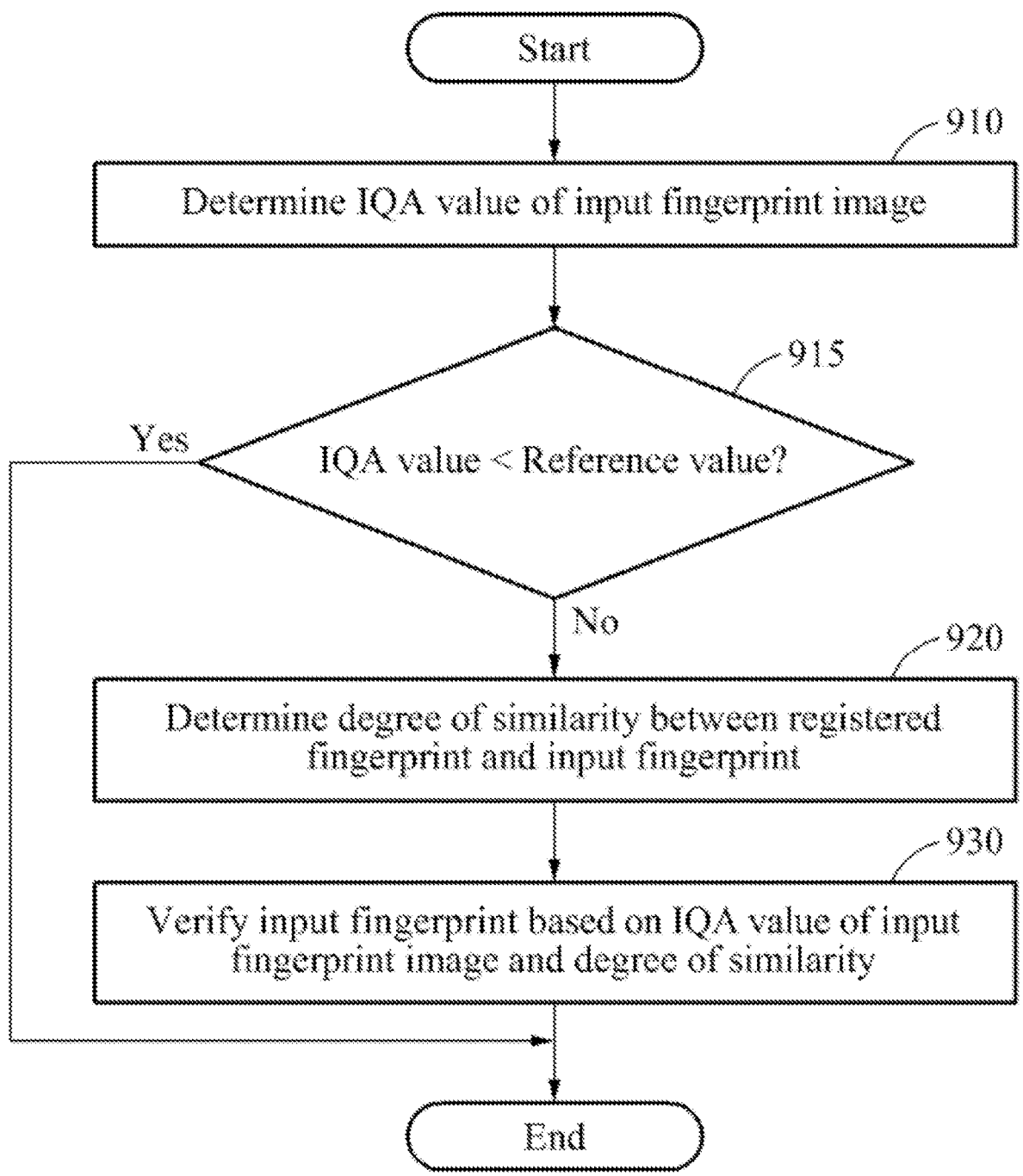
FIG. 9 is a flowchart illustrating a method of recognizing a fingerprint according to at least another example embodiment.

FIG. 9 is a flowchart illustrating an example method of recognizing a fingerprint according to at least one example embodiment. The method of FIG. 9 may be performed by the fingerprint recognizing apparatus 300, for example. Referring to FIG. 9, in operation 910, a fingerprint recognizing apparatus determines an IQA value of an input fingerprint image using various IQA methods. In an example, the fingerprint recognizing apparatus may process the input fingerprint image through bandpass filtering to obtain the processed input fingerprint image, and determine the IQA value based on a difference between the original input fingerprint image and the processed input fingerprint image.

Alternatively, the fingerprint recognizing apparatus may compare the IQA value of the input fingerprint image to a reference value at 915. In response to the IQA value being less than the reference value, the fingerprint recognizing apparatus may determine verifying an input fingerprint in the input fingerprint image to be a failure or output a message to request an input of a new fingerprint and end the method.

In operation 920, the fingerprint recognizing apparatus determines a degree of similarity between a preregistered fingerprint and the input fingerprint. For example, the fingerprint recognizing apparatus may match the input fingerprint to the registered fingerprint, and calculate a degree of similarity between fingerprint patterns using a feature point-based similarity measuring method. In operation 930, the fingerprint recognizing apparatus verifies the input fingerprint based on the IQA value of the input fingerprint image and the degree of similarity. The fingerprint recognizing apparatus determines a matching score by combining the IQA value of the input fingerprint image and the degree of similarity between the registered fingerprint and the input fingerprint, and verifies the input fingerprint by comparing the matching score to a threshold value. If the fingerprint is verified, a processor may proceed to control an electronic device to permit the user to use and/or access the electronic device.

Figure 10:
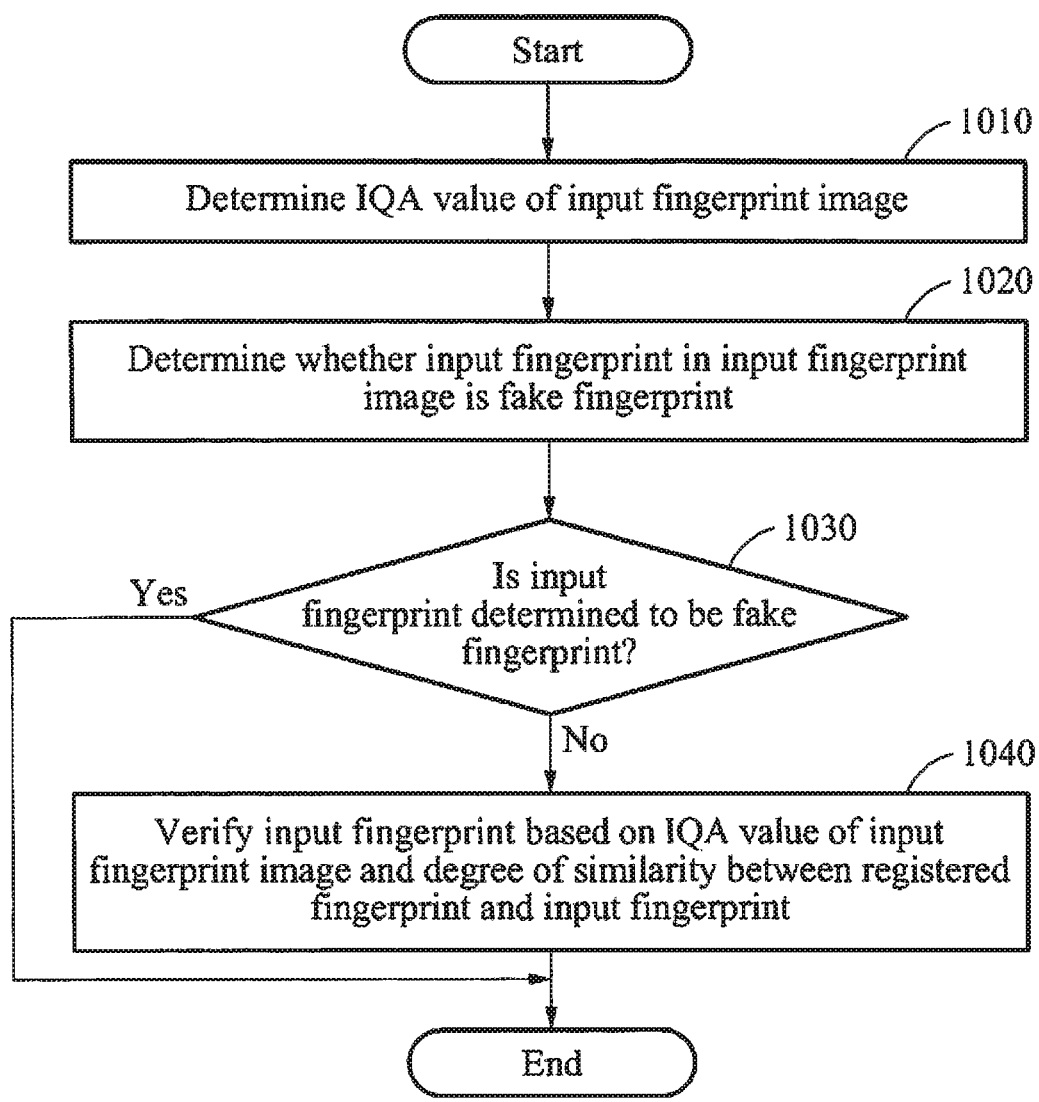
FIG. 10 is a flowchart illustrating a method of recognizing a fingerprint according to at least another example embodiment.

FIG. 10 is a flowchart illustrating a method of recognizing a fingerprint according to at least another example embodiment. The method of FIG. 10 may be performed by the fingerprint recognizing apparatus 400, for example. Referring to FIG. 10, in operation 1010, a fingerprint recognizing apparatus determines an IQA value of an input fingerprint image using various IQA methods. For example, the fingerprint recognizing apparatus may perform IQA in a block unit of the input fingerprint image and calculate a plurality of IQA values for each block. In operation 1020, the fingerprint recognizing apparatus determines whether an input fingerprint in the input fingerprint image is a fake fingerprint. The fingerprint recognizing apparatus generates a feature vector based on the IQA values calculated in a block unit of the input fingerprint image, and obtains a confidence value from a confidence determination model by inputting the feature vector to the confidence determination model. For example, the fingerprint recognizing apparatus may determine whether the input fingerprint is a fake fingerprint by comparing the confidence value to a threshold value.

When the fingerprint recognizing apparatus determines the input fingerprint to be a fake fingerprint in operation 1030, the fingerprint recognizing apparatus verifies the input fingerprint based on the IQA value of the input fingerprint image and a degree of similarity between a registered fingerprint and the input fingerprint in operation 1040. The fingerprint recognizing apparatus calculates a matching score by combining the IQA value and the degree of similarity, and determines a result of verifying the input fingerprint by comparing the matching score to a threshold value. If the fingerprint is verified, a processor may proceed to control an electronic device to permit the user to use and/or access the electronic device.

Figure 11:
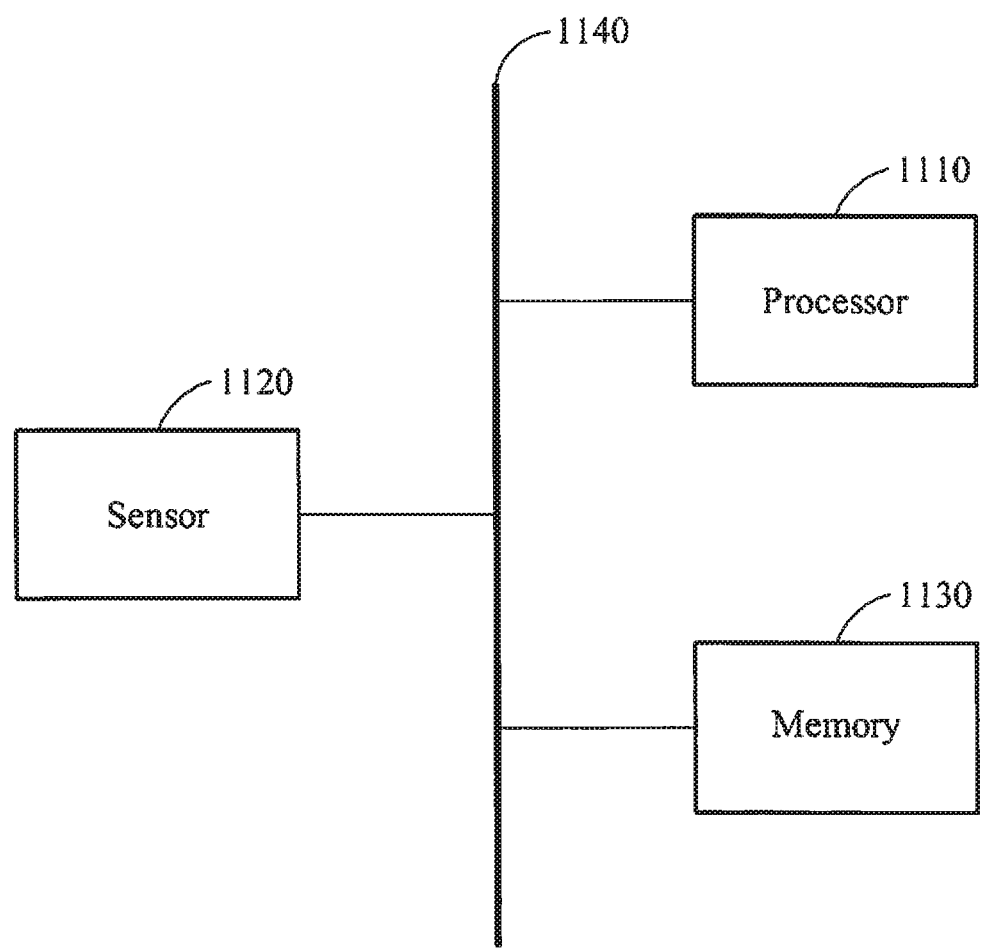
FIG. 11 is a diagram illustrating an electronic system according to at least one example embodiment.

FIG. 11 is a diagram illustrating an electronic system according to at least one example embodiment.

Referring to FIG. 11, the electronic system includes a sensor 1120, a processor 1110, and a memory 1130. The sensor 1120, the processor 1110, and the memory 1130 may communicate with one another through a bus 1140.

The sensor 1120 may be a fingerprint sensor configured to sense a fingerprint of a user and obtain a fingerprint image. The sensor 1120 captures the fingerprint image through a well-known method, for example, a method of converting an optical image to an electrical signal. The fingerprint image is transferred to the processor 1110.

The processor 1110 may perform the functions of the fake fingerprint detecting apparatus 200, the fingerprint recognizing apparatus 300 and the fingerprint recognizing apparatus 400 by executing instructions stored by the memory 1130. Thus, by executing the instructions stored by the memory 1130, the processor 1110 becomes a special purpose computing device that performs fake fingerprint detecting and/or fingerprint recognizing described above with reference to FIGS. 1 through 10. The processor 1110 may include one or more processing devices such as Central Processing Units (CPUs), digital signal processors (DSPs), application-specific-integrated-circuits, field programmable gate arrays (FPGAs) computers or the like. The memory 1130 stores fingerprint images captured by the sensor 1120 and registered, an input fingerprint image captured by the sensor 1120, a matching result processed by the processor 1110, and a value calculated by the processor 1110. The memory 1130 may be a volatile or a nonvolatile memory.

The processor 1110 executes a program and controls the electronic system. A program code executed by the processor 1110 is stored in the memory 1130. The electronic system may be connected to an external device, for example, a PC and a network, through an input and output device (not shown), and exchange data with each other.

Figure 12:
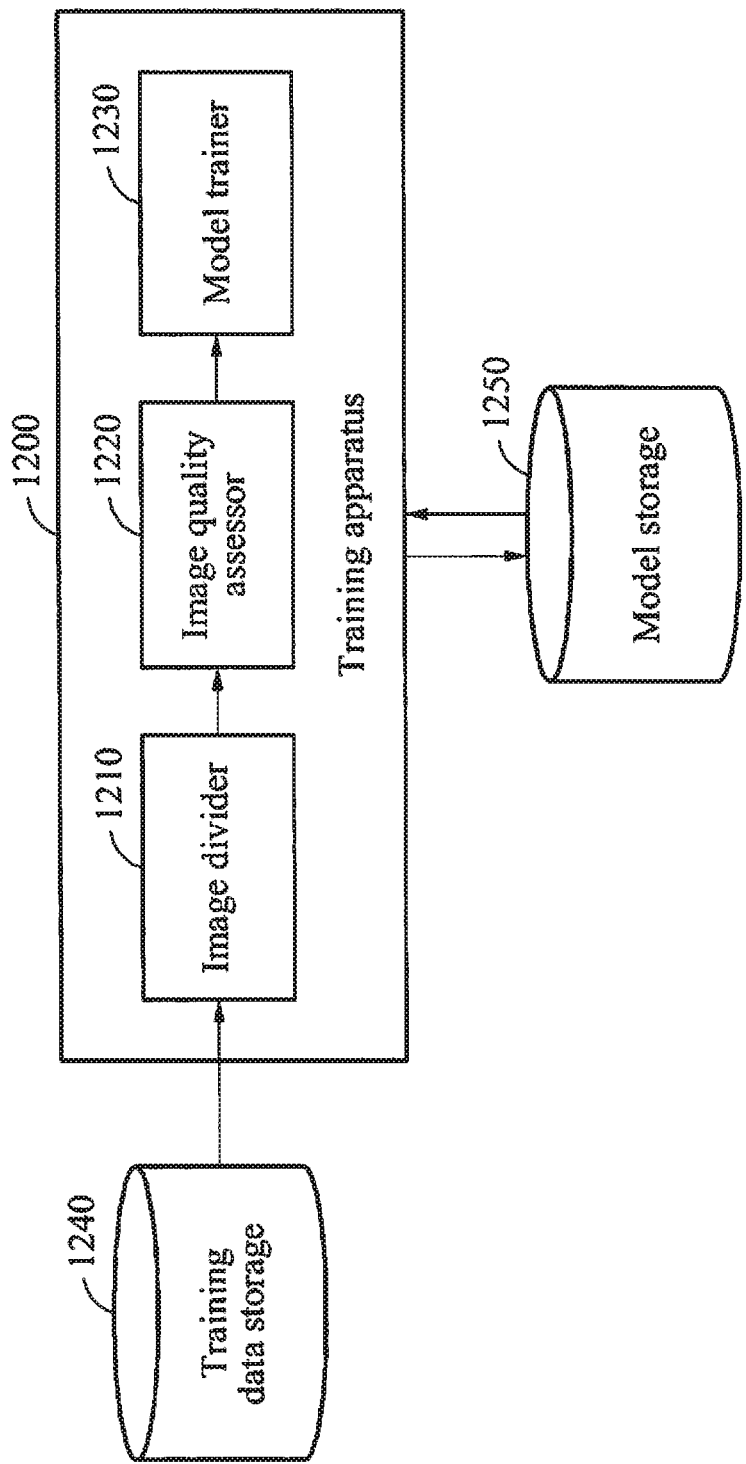
FIG. 12 is a diagram illustrating a training apparatus according to at least one example embodiment.

FIG. 12 is a diagram illustrating a training apparatus 1200 according to at least one example embodiment. The training apparatus 1200 may train a confidence determination model stored in a model storage 1250 based on training data stored in a training data storage 1240. The trained confidence determination model may be used to determine whether an input fingerprint is a fake fingerprint in the examples illustrated with reference to FIGS. 2, 4 through 8, and 10. The training data may include various training fingerprint images used to train the confidence determination model.

Referring to FIG. 12, the training apparatus 1200 includes an image divider 1210, an image quality assessor 1220, and a model trainer 1230. The image divider 1210 divides a training fingerprint image into a plurality of blocks. For example, the image divider 1210 may divide the training fingerprint image into the blocks to allow neighboring blocks to overlap, or divide a portion of the training fingerprint image into blocks.

The image quality assessor 1220 assesses an image quality for each block using various IQA methods and determines an IQA value for each block. For example, the image quality assessor 1220 may determine an IQA value of an input fingerprint image using IQA methods such as BIQI, NIQE, BRISQUE, and SSQE. When a plurality of IQA methods is used, the image quality assessor 1220 may determine a plurality of IQA values for one block.

In an example, the model trainer 1230 determines a feature vector based on the IQA values of the blocks calculated using the various IQA methods, and obtains a confidence value from the feature vector using the confidence determination model. The model trainer 1230 trains the confidence determination model based on the confidence value and a predefined and/or selected desired value. For example, the model trainer 1230 may determine a loss function based on a difference between the confidence value and the desired value, and adjust model parameters of the confidence determination model to allow the difference between the confidence value and the desired value to be a minimum based on the loss function. The model parameters of the confidence determination model may be updated through a training process. The confidence determination model completed with training and information about the model parameters may be stored in the model storage 1250.

Alternatively, the model trainer 1230 determines first confidence values from the IQA values of the blocks of the training fingerprint image using a first confidence determination model. Here, a first confidence value may be determined for each block. The model trainer 1230 determines a first loss function based on a difference between the first confidence value and a predefined and/or selected first desired value, and trains the first confidence determination model based on the first loss function. The model trainer 1230 generates a feature vector by concatenating the first confidence values determined for the blocks, and obtains a second confidence value from a second confidence determination model by inputting the generated feature vector to the second confidence determination model. The model trainer 1230 determines a second loss function based on a difference between the second confidence value and a predefined and/or selected second desired value, and trains the second confidence determination model based on the second loss function. Through such a training process described in the foregoing, model parameters of the first and the second confidence determination model may be updated. The first and the second confidence determination model completed with training and information about the model parameters may be stored in the model storage 1250.

The processor 1110 may perform the functions of the training apparatus 1200 by executing instructions stored by the memory 1130. More specifically, the processor 1110 may operate as the image divider 1210, the image quality assessor 1220, and the model trainer 1230 executing instructions stored by the memory 1130. The model storage 1250 and the training data storage may be part of the memory 1130.

The units and/or modules (e.g., the image divider 210, the image quality assessor 220, the fake fingerprint determiner 230, the image quality assessor 310, the similarity determiner 320, the fingerprint verifier 330, the image quality assessor 410, the fake fingerprint determiner 420, the fingerprint verifier 430, the image divider 1210, the image quality assessor 1220 and the model trainer 1230) described herein may be implemented using hardware components and/or processing devices executing software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media (i.e., memory) including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing a fingerprint, comprising:
   determining an image quality assessment (IQA) value of an input fingerprint image, the determining the IQA including,
      obtaining a processed input fingerprint image by filtering the input fingerprint image, and
      determining the IQA value of the input fingerprint image based on a difference between the input fingerprint image and the processed input fingerprint image;
   determining a degree of similarity between a registered fingerprint and an input fingerprint in the input fingerprint image;
   determining a matching score by multiplying the IQA value and the degree of similarity; and
   verifying the input fingerprint based on the matching score.

2. The method of claim 1, wherein the verifying the input fingerprint comprises:
   verifying the input fingerprint by comparing the matching score to a threshold value.

3. The method of claim 1, wherein the obtaining the processed input fingerprint image comprises:
   obtaining the processed input fingerprint image by bandpass filtering the input fingerprint image.

4. The method of claim 1, wherein the verifying the input fingerprint comprises:
   requesting a new input fingerprint image if the input fingerprint image is less than a reference value.

5. The method of claim 1, further comprising:
   controlling an electronic apparatus based on the verifying.

6. A computer program embodied on a non-transitory computer readable medium, the computer program being configured to control a processor to perform the method of claim 1.

7. An apparatus for recognizing a fingerprint, comprising:
   a memory configured to store computer readable instructions; and
   a processor configured to execute the computer readable instructions such that the processor is configured to cause the apparatus to
      obtain a processed input fingerprint image by filtering an input fingerprint image,
      determine an image quality assessment (IQA) value of the input fingerprint image based on a difference between the input fingerprint image and the processed input fingerprint image,
      determine a degree of similarity between a registered fingerprint and an input fingerprint in the input fingerprint image,
      determine a matching score by multiplying the IQA value and the degree of similarity, and
      verify the input fingerprint based on the matching score.

8. The apparatus of claim 7, wherein the processor is configured to execute the computer readable instructions such that the processor is configured to cause the apparatus to verify the input fingerprint by comparing the matching score to a threshold value.

9. The apparatus of claim 7, wherein the processor is configured to execute the computer readable instructions such that the processor is configured to cause the apparatus to obtain the processed input fingerprint image by bandpass filtering the input fingerprint image.

10. The apparatus of claim 7, wherein the processor is configured to execute the computer readable instructions such that the processor is configured to cause the apparatus to request a new input fingerprint image if the input fingerprint image is less than a reference value.

11. A method of recognizing a fingerprint, the method comprising:
    determining an image quality assessment (IQA) value of an input fingerprint image;
    determining a degree of similarity between a registered fingerprint and an input fingerprint in the input fingerprint image;
    determining a matching score using the IQA value and the degree of similarity; and
    verifying the input fingerprint based on the matching score, wherein the determining the matching score determines the matching score by multiplying the IQA value and the degree of similarity.

12. An apparatus for recognizing a fingerprint, the apparatus comprising:
    a memory configured to store computer readable instructions; and
    a processor configured to execute the computer readable instructions such that the processor is configured to cause the apparatus to
       determine an image quality assessment (IQA) value of an input fingerprint image,
       determine a degree of similarity between a registered fingerprint and an input fingerprint in the input fingerprint image,
       determine a matching score using the IQA value and the degree of similarity, and
       verify the input fingerprint based on the matching score, wherein the processor configured to execute the computer readable instructions such that the processor is configured to cause the apparatus to determine the matching score by multiplying the IQA value and the degree of similarity.

* * * * *